United States Patent
Shuler

(10) Patent No.: US 12,166,643 B2
(45) Date of Patent: Dec. 10, 2024

(54) MECHANISM TO CONTROL ORDER OF TASKS EXECUTION IN A SYSTEM-ON-CHIP (SoC) BY OBSERVING PACKETS IN A NETWORK-ON-CHIP (NoC)

(71) Applicant: ARTERIS, INC., Campbell, CA (US)

(72) Inventor: Kurt Michael Shuler, Sunnyvale, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 17/953,402

(22) Filed: Sep. 27, 2022

(65) Prior Publication Data

US 2023/0111522 A1 Apr. 13, 2023

Related U.S. Application Data

(60) Provisional application No. 63/249,035, filed on Sep. 28, 2021.

(51) Int. Cl.

| G06F 15/173 | (2006.01) |
| G06F 9/48 | (2006.01) |
| G06F 15/78 | (2006.01) |
| H04L 41/147 | (2022.01) |
| H04L 43/028 | (2022.01) |
| H04L 43/062 | (2022.01) |

(52) U.S. Cl.
CPC .......... *H04L 41/147* (2013.01); *G06F 9/4881* (2013.01); *G06F 15/7825* (2013.01); *H04L 43/028* (2013.01); *H04L 43/062* (2013.01)

(58) Field of Classification Search
CPC ... H04L 41/147; H04L 43/028; H04L 43/062; G06F 9/4881; G06F 15/7825
See application file for complete search history.

(56) References Cited

U.S. PATENT DOCUMENTS

| 10,235,625 B1* | 3/2019 | Walters | G06N 3/04 |
| 2014/0222149 A1* | 8/2014 | Amis | A61F 2/30756 |
| | | | 623/14.12 |
| 2014/0328172 A1* | 11/2014 | Kumar | H04L 47/18 |
| | | | 370/231 |
| 2019/0028357 A1* | 1/2019 | Kokkula | H04L 41/145 |
| 2021/0109795 A1* | 4/2021 | Colombo | G06F 9/4881 |
| 2022/0004433 A1* | 1/2022 | Vega | G06Q 20/145 |
| 2023/0267307 A1* | 8/2023 | Wang | G06N 3/006 |
| | | | 706/25 |

* cited by examiner

*Primary Examiner* — Duyen M Doan
(74) *Attorney, Agent, or Firm* — Jubin Dana; Dana Legal Services

(57) ABSTRACT

A network-on-chip (NoC) provides packet-based communication between a plurality of initiator computing elements and a plurality of target computing elements. The NoC includes a plurality of observer processors upstream of and corresponding to the target computing elements. Each observer processor is configured to perform packet inspection and generate information in real-time about traffic load on its corresponding target computing element. An aggregator processor is configured to process the traffic load information from the observer processors to identify those target computing elements that are most heavily contended.

18 Claims, 5 Drawing Sheets

MECHANISM TO CONTROL ORDER OF TASKS EXECUTION IN A SYSTEM-ON-CHIP (SoC) BY OBSERVING PACKETS IN A NETWORK-ON-CHIP (NoC)

CROSS REFERENCE TO RELATED APPLICATION

The present application claims the priority benefit of U.S. Provisional Application Ser. No. 63/249,035 filed on Sep. 28, 2021 and titled A MECHANISM TO CONTROL ORDER OF TASKS EXECUTION BY OBSERVING PACKETS IN A NETWORK-ON-CHIP by Kurt Michael SHULER, the entire disclosure of which is incorporated herein by reference.

TECHNICAL FIELD

The present technology is in the field of electronic systems and, more specifically, controlling task execution in a system-on-chip (SoC) having computing elements connected through a network-on-chip (NoC).

BACKGROUND

A system-on-chip may include a network-on-chip for providing packet-based communication between computing elements (e.g., CPUs) and shared resources (e.g., memory). A typical computing element may schedule the execution of its tasks according to a task scheduling policy that is local to the computing element. Each computing element performs its task scheduling independently of the other computing elements in the system.

Such independent scheduling can lead to issues such as contention for resources such as memory access by multiple computing elements simultaneously. This, in turn, may result in the system working at high frequency to serve all tasks needs, possibly followed by idle periods when tasks are finished and wait for an event, or are able to run without requiring access to the shared resource, for instance, from their local cache.

More contention translates to higher power, higher working frequency, and lower system performance.

SUMMARY

In accordance with various embodiments and aspects herein, systems and methods are disclosed for addressing the contention problem among a plurality of initiator computing elements and a plurality of target computing elements. A NoC provides packet-based communication between the initiator computing elements and the target computing elements. The NoC includes a plurality of observer processors upstream of and corresponding to the target computing elements. Each observer processor is configured to perform packet inspection and generate information in real time about traffic load on its corresponding target computing element. An aggregator processor is configured to process the traffic load information from the observer processors to identify those target computing elements that are most heavily contended.

BRIEF DESCRIPTION OF THE DRAWINGS

In order to more fully understand the invention, reference is made to the accompanying drawings or figures. The aspects and embodiments in the following description are described with reference to the drawings or figures (FIG.), in which like numbers represent the same or similar elements. Understanding that these drawings are not to be considered limitations in the scope of the invention, the presently described aspects and embodiments and the presently understood best mode are described with additional detail through use of the accompanying drawings.

DETAILED DESCRIPTION

Figure 1:
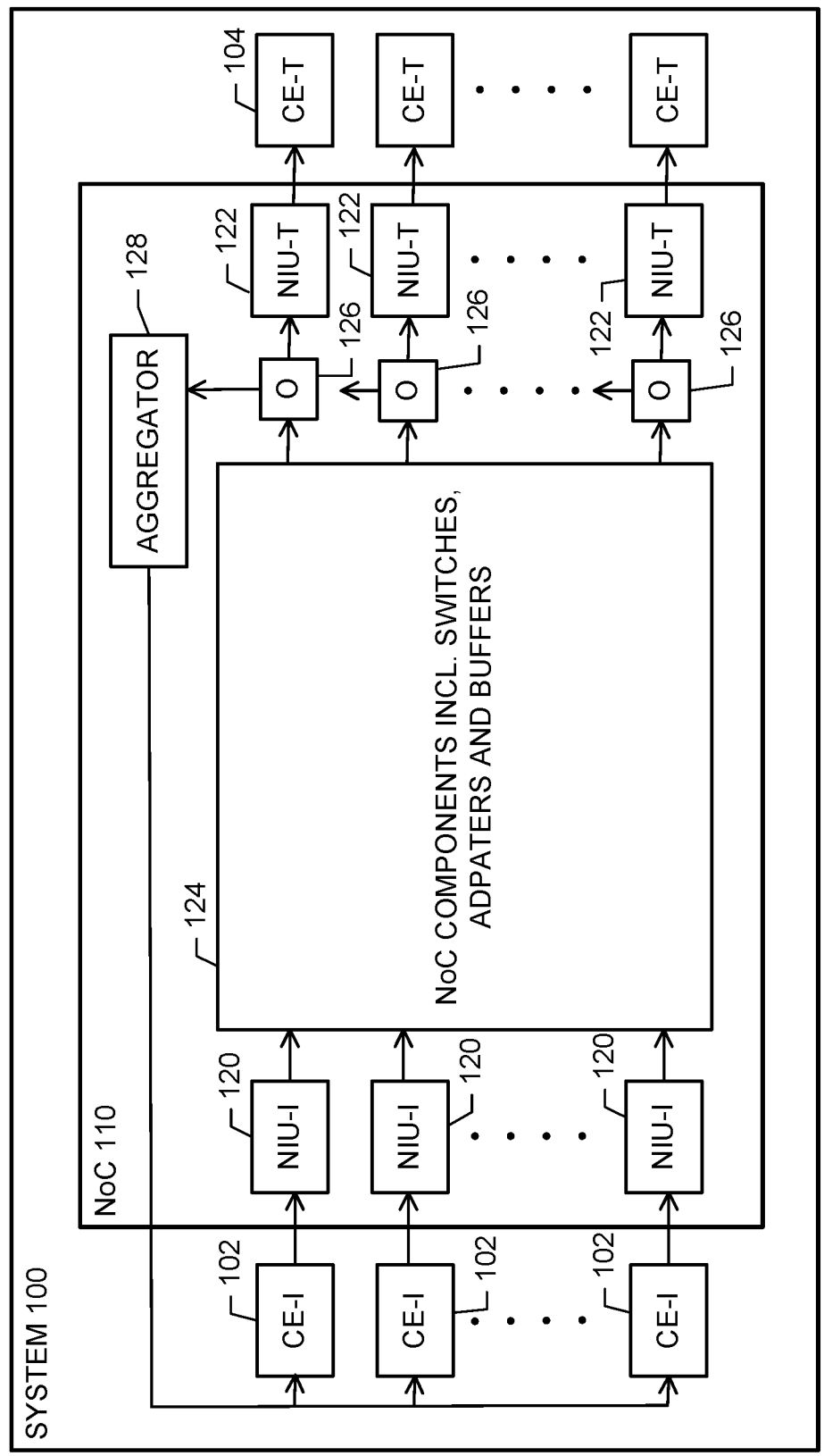
FIG. 1 illustrates a system including a network-on-chip (NoC).

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

The terms "path" and "route" are used interchangeable herein. Paths includes and are made up of any combination of nodes and edges (edges are also referred to herein as links), along which data travels form source to destination (sink or target). As used herein, a "master," an "initiator," and "source node" refer to similar intellectual property (IP) blocks, units, or modules. The terms "master" and "initiator" and "source node" are used interchangeably within the scope and embodiments of the invention. As used herein, a "slave," a "target," and "sink node" refer to similar IP blocks; the terms "slave" and "target" and "sink node" are used interchangeably within the scope and embodiments of the invention. As used herein, a transaction may be a request transaction or a response transaction. Examples of request transactions include write request and read request.

As used herein, a node is defined as a distribution point or a communication endpoint that is capable of creating, receiving, and/or transmitting information over a communication path or channel. A node may refer to any one of the following: switches, splitters, mergers, buffers, and adapters. As used herein, splitters and mergers are switches; not all switches are splitters or mergers. As used herein and in accordance with the various aspects and embodiments of the invention, the term "splitter" describes a switch that has a single ingress port and multiple egress ports. As used herein and in accordance with the various aspects and embodiments of the invention, the term "merger" describes a switch that has a single egress port and multiple ingress ports.

Reference is made to FIG. 1, which illustrates a system 100 including a plurality of computing elements (CE) 102 and 104 and an NoC 110 that provides packet-based communication between the computing elements 102 and 104. Examples of the computing elements 102 and 104 include, but are not limited to, a video card, central processing unit (CPU), graphics processing unit (GPU), deep neural network accelerator, camera, direct memory access (DMA), random access memory (RAM), dynamic random access memory (DRAM), input/output (IO), and hard disk drive (HDD). Those computing elements 102 that provide data to the NoC 110 are referred to as initiator computing elements or initiators 102, and those computing elements 104 that receive data from the NoC 110 are referred to as target computing elements or targets 104. The system 100 may be implemented as a system-on-chip (SoC).

Only a request network is illustrated in FIG. 1. A response network also exists and may be symmetrical, wherein the targets of the request network are now initiators in the response network and the initiators in the request network become targets in the response network.

Each initiator 102 may include a task scheduler that schedules the execution of its tasks. A task as used herein refers to a set of operations that, when executed by an initiator 102, performs some useful work. Each initiator 102 may assign priorities to the various tasks and execute the tasks in order of priority. Each initiator 102 may have been programmed independently, by a different team, in a way that does not account for other activity in the system 100. For instance, each initiator 102 schedules its tasks according to a task scheduling policy that is local to the initiator 102. Without a system-wide view of the scheduling, each initiator 102 would perform its task scheduling independently of the other initiators 102.

Such independent scheduling would lead to issues such as contention for resources. For example, targets 104 such as memory might be shared by multiple initiators 102. At least some of those initiators 102 might try to access the shared memory simultaneously.

The NoC 110 includes a plurality of network interface units (NIUs) 120 and 122, which interface with the initiators 102 and the targets 104. These NIUs 120 are responsible for translating several supported protocols and data sizes to and from a packet transport protocol. Those NIUs 120 that interface with initiators 102 are referred to as initiator NIUs 120, and those NIUs 122 that interface with targets 104 are referred to as target NIUs 122.

The NoC 110 further includes other components 124, such as switches, width adapters, firewalls, clock adapters, rate adapters, link probes, etc. Switches are used to route flows of traffic between the initiator NIUs 120 and the target NIUs 122. Adapters deal with various conversions between data width, clock, and power domains (e.g., CPU power domain). Buffers are used to insert pipelining elements to span long distances or store packets to deal with rate adaptation between fast initiators and slow targets or vice-versa. These components 120, 122 and 124 may use an internal NoC transport protocol to communicate with each other.

The NoC 110 is superior to the old point-to-point connectivity by way of a more scalable communication architecture. Nevertheless, contention can still occur.

To address the contention problem, the NoC 110 further includes a plurality of processors referred to as observer modules or observer processors 126, and a processor referred to as an aggregator module or aggregator processor 128. The observer processors 126 are upstream of and correspond to the targets 104. For the example shown in FIG. 1, each observer processor 126 is connected between block 124 and its corresponding target NIU 122. An observer processor 126 receives packets from block 124, and forwards the packets to its corresponding target NIU 122, which then sends data to the corresponding target 104. Each observer processor 126 is configured (e.g., programmed) to perform packet inspection and generate information in real time about traffic load on its corresponding target 104 and also to generate per-task statistics.

Figure 2:
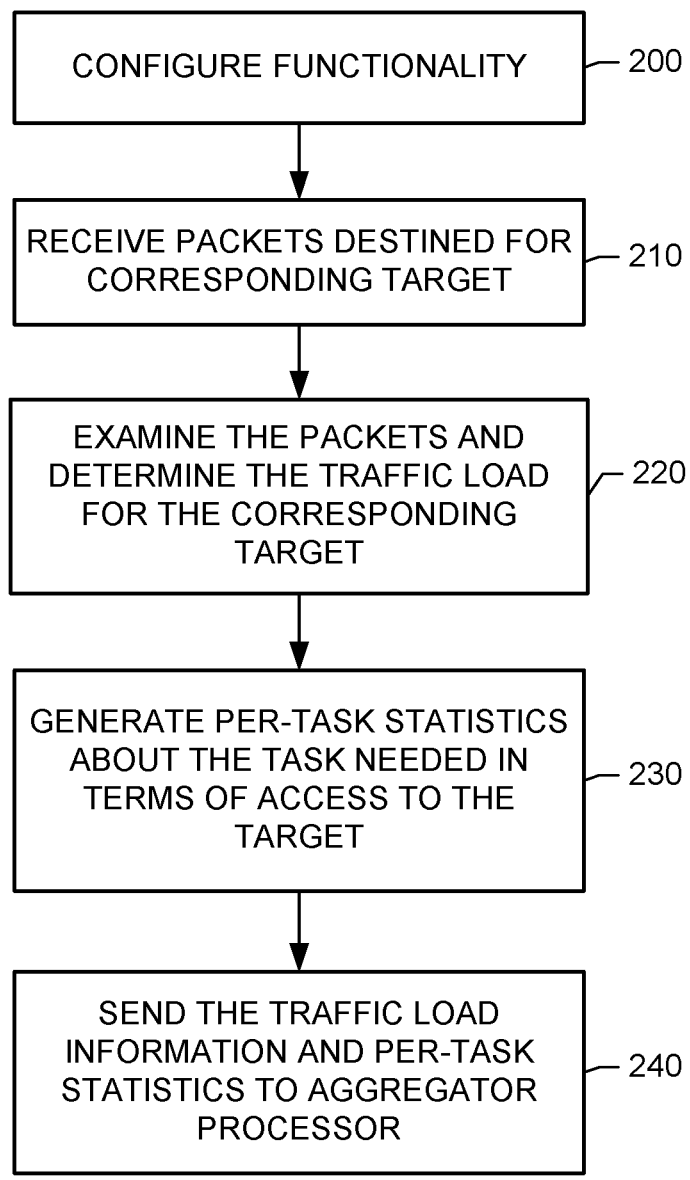
FIG. 2 illustrates a method performed by an observer processor that forms a part of the NoC of FIG. 1.

Additional reference is made to FIG. 2, which illustrates the operation of each observer processor 126. At block 210, the observer processor receives packets destined for its corresponding target 104.

At block 220, the observer processor 126 examines the packets and determines the traffic load for the corresponding target 104. The observer processor 126 may be configured to read packet header information such as source, destination and packet length. This traffic load information may be sent continuously to the aggregator processor 128. In the alternative, traffic load information may be generated periodically, whereby the observer processor 126 may be configured to continuously read the header information and generate statistics (e.g., histograms) about the traffic load information at each interval. Those statistics may be sent to the aggregator processor 128.

At block 230, the observer processor 126 also examines the packets and generates per-task statistics about the task needs in terms of access to the target 104. Each packet may be tagged by the task that has initiated it. A tag may, for instance, include a unique integer that identifies the task that initiated the packet.

Every packet that goes through an observer processor 126 contributes to the statistics for the corresponding task. Useful statistic metrics include, but are not limited to, average bandwidth over a certain window of time, peak bandwidth, average latency, and peak latency.

At block 240, the observer processor 126 sends the traffic load information and the per-task statistics to the aggregator processor 128. This may be done continuously or at periodically.

In some embodiments, the observer processor 126 may also have certain functionality that is enabled or configured by the aggregator processor 128. As a first example, the observer processor 126 may receive commands from the aggregator processor 128 to observe certain additional types of packet information (e.g., tags, user bits). As a second example, the aggregator processor 128 may command the observer processor 126 to generate statistical information for only certain types of tasks. As a third example, the aggregator processor 128 may command the observer processor 126 to perform the packet inspection continually and send the traffic load information to the aggregator processor 128 continuously, or to perform the packet inspection and generate the traffic load information and per-task statistics at a controllable sampling rate. The aggregator processor 128 may also command the sampling rate. The configuration may be performed at block 200.

The aggregator processor 128 is configured (e.g., programmed) to process the traffic load information and the per-task statistics from all of the observer processors 126 to identify those targets 104 that are most heavily contended, and also to generate task scheduling feedback for the initiators 102. The aggregator processor 128 creates a system-wide view of initiator task activity and target traffic in the system 100.

Figure 3:
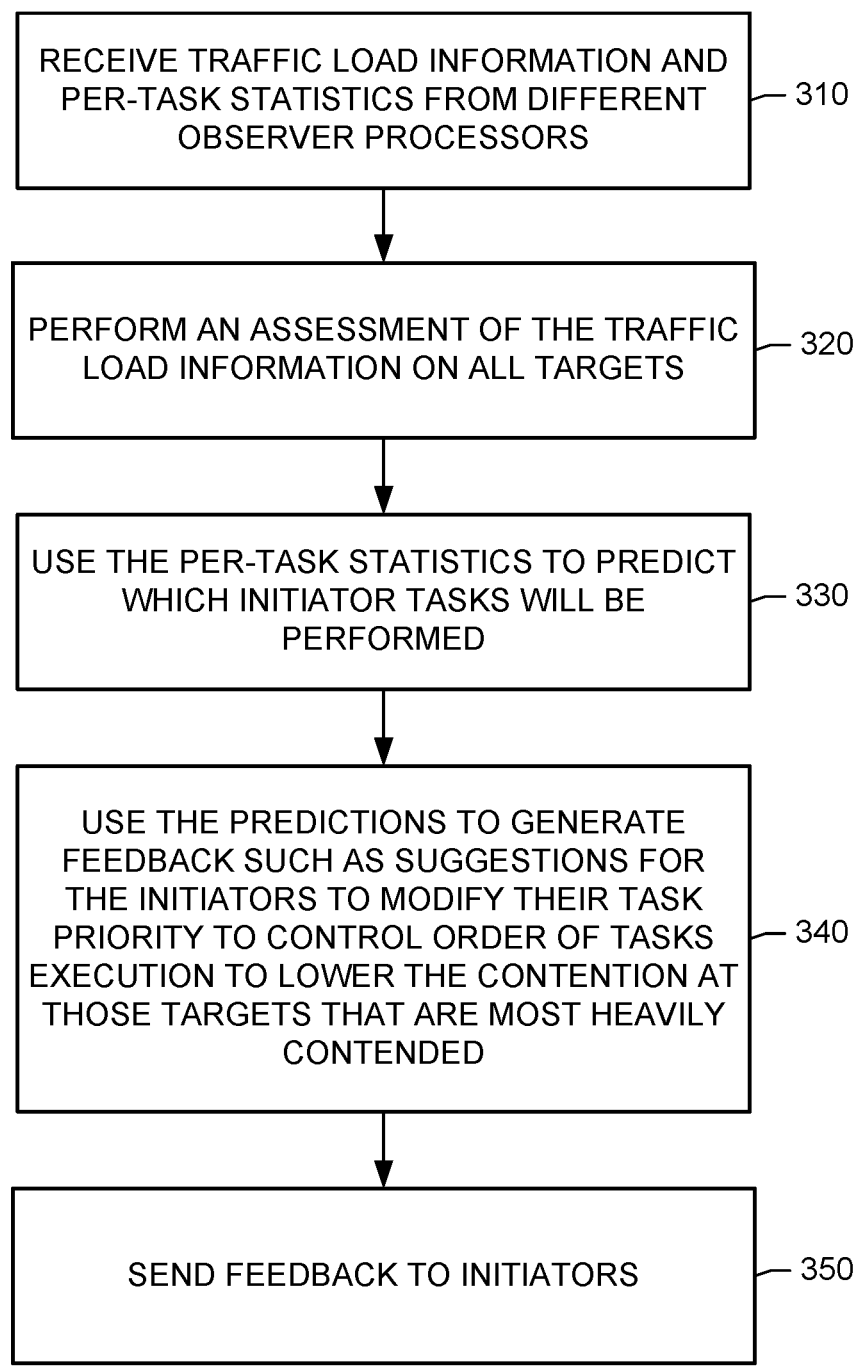
FIG. 3 illustrates a method performed by an aggregator processor that forms a part of the NoC of FIG. 1.

Additional reference is made to FIG. 3, which illustrates the operation of the aggregator processor 128. At block 310, the aggregator processor receives traffic load information and the per-task statistics from the different observer processors 126.

At block 320, the aggregator processor performs an assessment of the current traffic load information on all of the targets 104. This assessment, which may be performed algorithmically, identifies the targets 104 that are most heavily contended.

At block 330, the aggregator processor 128 uses the per-task statistics to predict which tasks will be performed by the initiators 102. The aggregator processor 128 may build internally a view of system behavior, and build a prediction model of when the tasks are scheduled on average in the system 100. The prediction model may be an algorithm or it may incorporate a machine learning (ML) model (e.g., a deep neural network). The machine learning model may be trained over time as the system 100 runs to improve its predictions about when the tasks might be scheduled, and therefore more accurately predict upcoming situations where contention at a target is high.

At block 340, the aggregator processor 128 uses the predictions to generate feedback such as suggestions for the initiators 102 to modify their task priority to control order of tasks execution to lower the contention at the targets that are most heavily contended. For example, the aggregator processor 128 rearranges the predicted tasks to lower the contention. The aggregator processor 128 prepares a suggested task priority for the initiators 102. The task priorities are merely suggested because the aggregator processor 128 does not schedule the tasks proper, as it does not know about, for instance, the tasks dependency amongst themselves, or other local constraints to the initiators 102.

At block 350, the aggregator processor 128 sends the feedback to the initiators 102. The feedback may be sent on a 1:1 basis to each initiator 102, or it may broadcasted on a 1:many basis, where each initiator 102 filters out the suggestions for the other initiators 102. The initiators 102 may or may not act on that feedback.

Consider the example in which the aggregator processor 128 predicts that in a future time slot, first and second initiators 102 will launch two tasks (Ta and Tb) that access a first target 104 simultaneously, followed by a task (Tc) on the first initiator 102 that will access a second target 104. The aggregator processor 128 can provide a suggestion to the first initiator 102 to schedule task Tc first (access the second target), along with the second initiator 104 scheduling task Tb (which accesses the first target), and then provide a suggestion to the first initiator 102 to schedule task Ta (which access the first target after the second initiator has finished doing so).

A system herein is not limited to the system 100 of FIG. 1. For example, instead of tagging all packets from all tasks with a unique identifier, the system 100 could choose to only identify a subset of tasks, chosen to be the ones benefiting the most from the scheduling changes made possible by the predictions and feedback.

Other variations to the system 100 of FIG. 1 include, but are not limited to the following. The observation processors 126 are not limited to being connected to corresponding target NIUs 122. In some instances, observation processors may be integrated with the target NIU (the observer processors are still considered to be upstream of the NIU). In other instances, the observer processors 126 may be further upstream, such as at the initiator side).

FIG. 1 shows the observer processors 126 and the aggregator processor 128 as part of the NoC 110. In another embodiment, the aggregator processor may be outside the NoC the observer processors are still part of the NoC. In yet another embodiment, the observer processors 126 and the aggregator processor 128 are outside the NoC.

The system 100 may be a SoC. However, it is not so limited.

Figure 4:
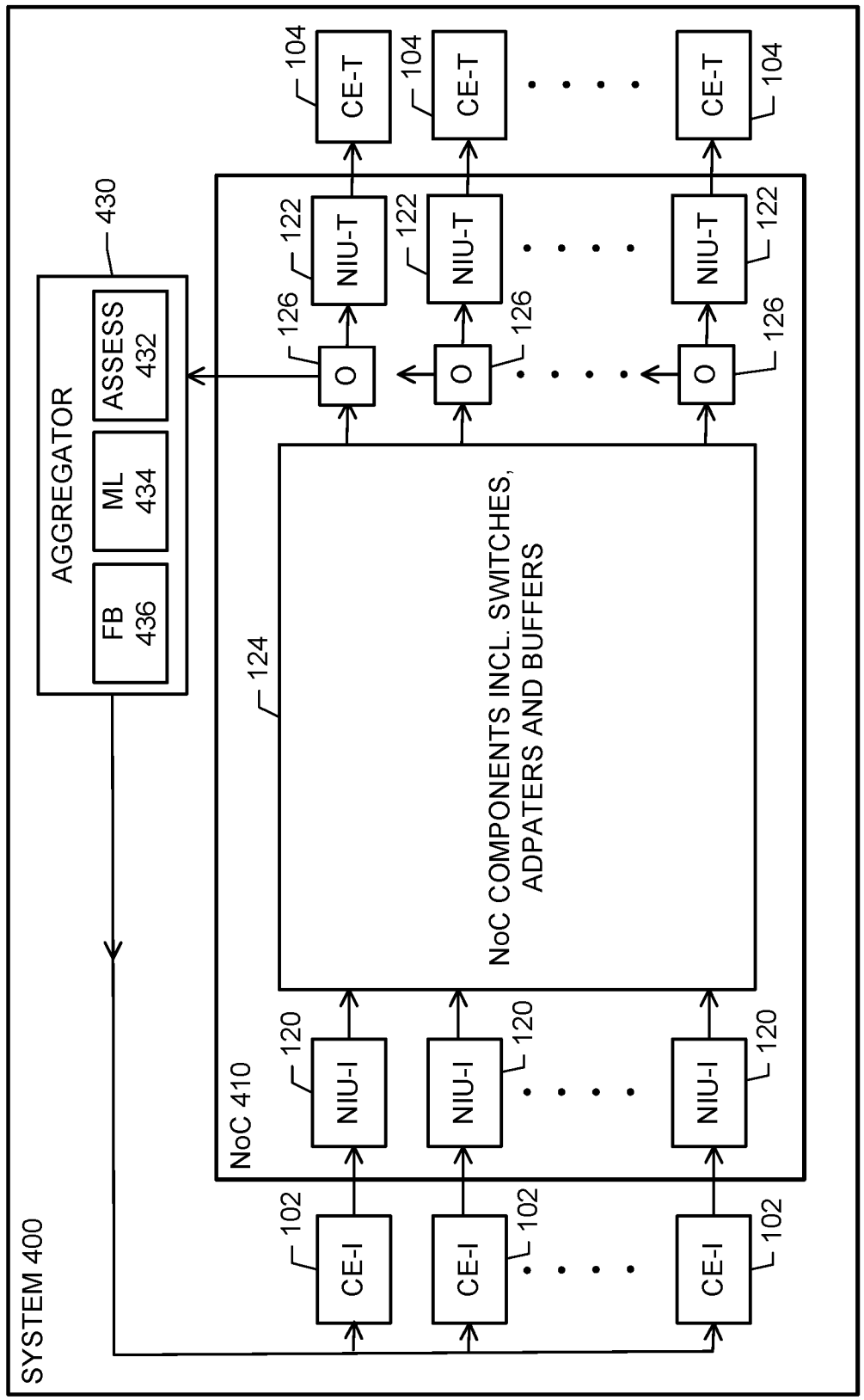
FIG. 4 illustrates a system-on-chip (SoC) including a NoC.

Reference is now made to FIG. 4, which shows an SoC 400 that includes a NoC 410. The NoC 410 of FIG. 4 differs from the NoC 110 of FIG. 1 in that the aggregator processor 430 is outside the NoC 410, and that the aggregator processor 430 is tied to machine learning for predictions. The aggregator processor 430 includes a module 432 for performing an assessment of the current traffic load information on all of the targets 104, a machine learning model 434 for task prediction, and a module 436 for rearranging the predicted tasks to lower contention, generating suggestions from the rearranged tasks, and sending the suggestions to the initiators 102. The machine learning model 434 may be trained with training sets that include the per-task statistics and corresponding tasks that are performed.

The observer processors 126 and the aggregator processor 430 may be configured to provide feedback for other SoC functions. One such SoC function is power consumption. The observer processors 126 may be configured to determine power consumption for each task. The SoC 400 has built-in power controllers and a power management unit. The observer processors 126 may be configured to communicate directly with the power controllers, and the aggregator processor 430 may be configured to communicate directly with the power management unit to determine whether a power budget is being exceeded. If the power budget is exceeded, the ML model 434 predicts the tasks that will be performed by the initiators 102, and the feedback module 436 uses the per-task power consumption and the predictions to rearrange task priority to reduce power consumption. The suggested task priority is sent to the initiators 102 as suggestions.

Another SoC function is functional safety. The SoC 400 may include a safety controller for dealing with software errors, errors due to physical phenomenon and other causes of glitches in one or more computing elements. The ML model 434 predicts tasks that will be performed by the initiators 102, and the feedback module 436 sends the predictions to the safety controller to help it address any safety issues. In accordance with some aspects of the invention, the feedback module 436 receives input from a user related to the predictions and provides the user input as feedback information to the ML model 434. The user feedback is used to train the model and provide better artificial intelligence (AI) responses and predictions as output. In accordance with some aspects of the invention, the ML model 434 may also be in communication with another AI system that acts as an adversarial system for the purpose of generating feedback and training the ML model 434.

Yet another SoC function is security. The assessment module 432 identifies those targets 104 that are most contended. The assessment model 432 may be further configured to identify security issues related to those heavily-contended targets 104. For instance, the assessment module 432 knows what the use cases should be for the targets 102. If irregular traffic loading is detected for a given target, a flag is raised. The feedback module 436 is configured to send suggestions to one or more of the initiators 102 to address the security issue. For example, the feedback module 436 can send suggestions to stop sending data to the flagged target.

Figure 5:
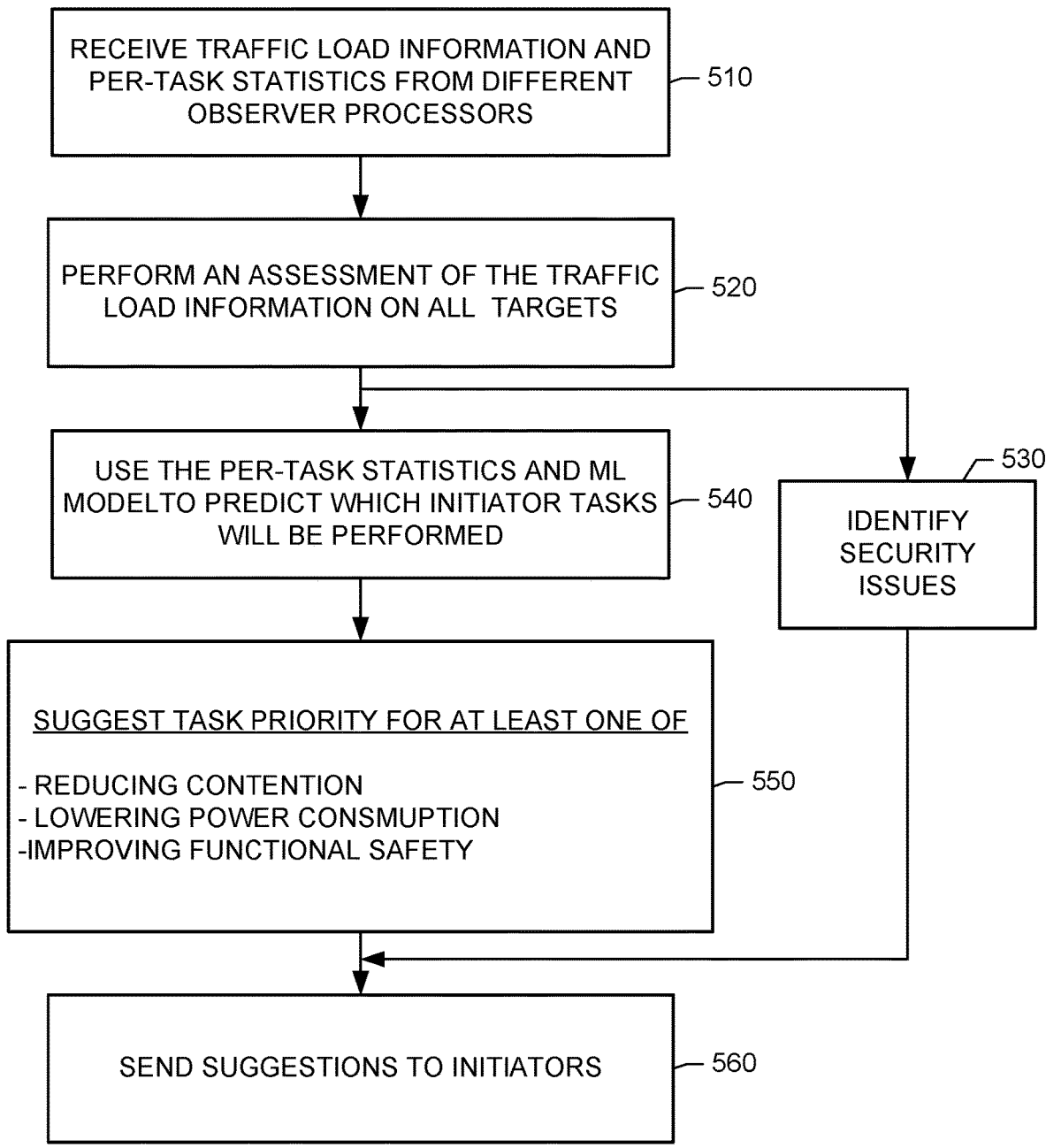
FIG. 5 illustrates a method performed by an aggregator processor that forms a part of the NoC of FIG. 4.

Additional reference is made to FIG. 5, which illustrates a method that may be performed by the aggregator processor 430 of FIG. 4. At block 510, the aggregator processor 430 receives traffic load information and per-task statistics from the different observer processors 126.

At block 520, the assessment module 432 performs an assessment of the traffic load information. At block 530, the assessment module 432 may also use the assessment to identify any security issues with any targets 102.

At block 540, the ML model 434 uses the per-task statistics to predict which initiator tasks will be performed. At block 550, the feedback module 436 uses those predictions to create suggestions or hints for at least one of reducing contention, lowering power consumption, and improving functional safety. At block 560, the feedback module 436 sends the suggestions to the initiators 126.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified, and/or omitted without modifying the functional aspects of these examples as described.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments and aspects that are shown and described herein. Rather, the scope and spirit of the invention is embodied by the appended claims.

The invention claimed is:

1. An electronic system comprising:
 a plurality of initiator computing elements and a plurality of target computing elements;
 a network-on-chip (NoC) for providing packet-based communication between the plurality of initiator computing elements and the plurality of target computing elements, the NoC including a plurality of observer processors upstream of and corresponding to the plurality of target computing elements, each observer processor configured to perform packet inspection and generate information in real time about traffic load on its corresponding target computing element; and
 an aggregator processor, wherein the aggregator processor receives traffic load information from at least one observer processor of the plurality of observer processors to build a task schedule prediction model using a machine learning model to predict upcoming contention at a specific target computing element and processes the traffic load information from the at least one observer processor of the plurality of observer processors to identify target computing elements that are most heavily contended.

2. The system of claim 1, wherein the system is a system-on-chip; and wherein the aggregator processor is included in the NoC.

3. The system of claim 1, wherein each observer processor of the plurality of observer processors is further configured to generate per-task statistics from the received packets, the received packets identifying the tasks.

4. The system of claim 3, wherein at least some of the plurality of observer processors are configured to perform the packet inspection and generate the traffic load information and the per-task statistics at a controllable sampling rate; and wherein the aggregator processor is configured to communicates with those observer processors to control the sampling rates.

5. The system of claim 3, wherein the aggregator uses the per-task statistics to predict which tasks will be performed by the initiator computing elements.

6. The system of claim 5, wherein the aggregator processor is configured to use the predictions to generate feedback for the initiator computing elements to modify task priority to control order of tasks execution to lower contention at the target computing elements that are most heavily contended.

7. The system of claim 6, wherein the aggregator processor includes a trained machine learning model for making the predictions.

8. The system of claim 6, wherein the aggregator processor further includes a module for determining a suggested task priority that reduces contention; and sends the suggested task priority to the initiator computing elements.

9. The system of claim 6, wherein the plurality of observer processors are further configured to determine per-task power consumption; and wherein the aggregator processor is further configured to provide feedback to the computing elements based on the predicted tasks to control order of task execution to reduce power consumption.

10. The system of claim 6, wherein the aggregator processor is further configured to provide feedback to the computing elements based on the predicted tasks to control order of task execution to improve functional safety.

11. The system of claim 1, wherein the aggregator processor is further configured to identify security issues based on the traffic load information, and send feedback to the initiator computing elements to address the security issues.

12. A system for controlling task execution in a system-on-chip (SoC) including a plurality of computing elements, including initiator computing elements and target computing elements, and a network-on-chip (NoC), the system comprising:
an aggregator processor; and
packet observer processors,
wherein the packet observer processors are in communication with the aggregator processor;
wherein the aggregator processor receives traffic load information from at least one packet observer processor selected from the packet observer processors and builds a view of the SoC's behavior, which includes a task scheduling prediction using a machine learning model to predict upcoming contention at a specific target computing element, including detecting the target computing elements that are most heavily contended and predicting which tasks will be performed.

13. The system of claim 12, wherein the packet observer processors are configured to perform packet inspection, generate information in real time about traffic load, and generate per-task statistics.

14. The system of claim 13, wherein the aggregator is configured to use the per-task statistics to predict which tasks will be performed.

15. The system of claim 14, wherein the aggregator processor is configured to use the predictions to generate suggestions for task priority to control order of tasks execution to lower contention at the target computing elements that are most heavily contended.

16. The system of claim 14, wherein the aggregator processor includes a trained machine learning model for making the predictions.

17. The system of claim 12, wherein the packet observer processors and the aggregator are part of the NoC.

18. A method of reducing contention of shared resources in a system including a plurality of computing elements, having initiators and targets, and a network-on-chip (NoC), which provides packet-based communication between the plurality of computing elements, the method comprising:
performing packet inspection of packets within the NoC to generate information in real time about traffic load and per-task statistics;
processing the traffic load information, using a machine learning model that generates a system behavior view based on the traffic load information, to identify those computing elements that are most heavily contended;
processing the per-task statistics to predict tasks that will be performed based on the view of system behavior to build a task scheduling prediction model to predict upcoming contention at a specific target; and
sending feedback to an initiator to suggest modifications to task priority to lower contention at one or more targets that are most heavily contended.

* * * * *